G. H. JOHNSON.
Hub-Bands for the Wheels of Vehicles.
No. 139,317. Patented May 27, 1873.

Witnesses:
A. Bennerkendorf
C. Sedgwick

Inventor:
G. H. Johnson
Per
Munn & Co.
Attorneys.

AM. PHOTO-LITHOGRAPHIC CO. N.Y. (OSBORNE'S PROCESS.)

UNITED STATES PATENT OFFICE.

GEORGE H. JOHNSON, OF BRIDGEPORT, CONNECTICUT.

IMPROVEMENT IN HUB-BANDS FOR THE WHEELS OF VEHICLES.

Specification forming part of Letters Patent No. 139,317, dated May 27, 1873; application filed March 29, 1873.

*To all whom it may concern:*

Be it known that I, GEORGE H. JOHNSON, of Bridgeport, in the county of Fairfield and State of Connecticut, have invented a new and Improved Carriage-Wheel Hub-Band, of which the following is a specification:

The invention consists in the improvement of trimming-bands for wheel-hubs, as hereinafter described and pointed out in the claim.

Figure 1:
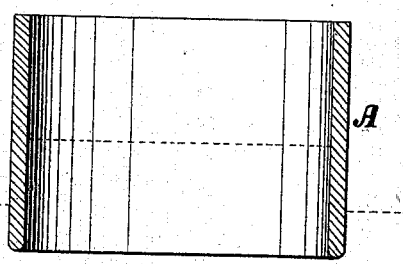
Figure 2:
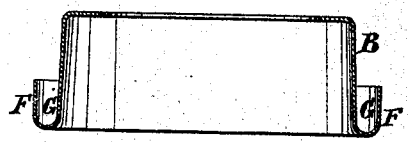
Figure 3:
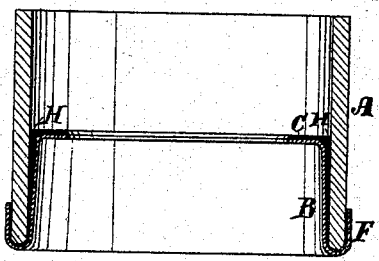
Figure 4:
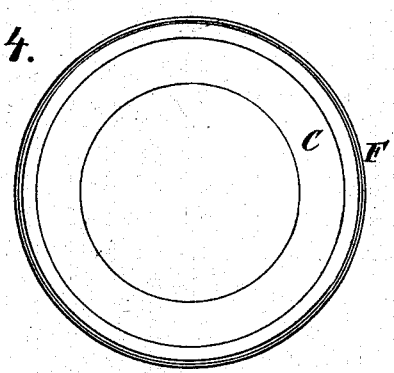

Figure 1 is a section of the iron hub-band, to which the trimming-band is to be applied. Fig. 2 is a section of the trimming-band. Fig. 3 is a section of the hub-band and trimming-band, fitted and secured together according to my improvement. Fig. 4 is a front elevation of Fig. 3.

Similar letters of reference indicate corresponding parts.

A represents the iron band of the outer end of the hub of the carriage-wheel, to which the ornamental trimming-band of ductile metal is to be applied, and which, in this example, is represented in the cylindrical form; but in some cases they are made with the outer end flaring or bell-shaped, to which my invention is also applicable. B represents the cylindrical band of brass or other soft fine metal capable of being spun and of being polished brightly. This band is formed so as to fit in band A nicely, as shown in Fig. 3, and provided with a collar, C, at the inner end, as they have heretofore been made; the collar being to fit against the end of the hub. At the outer end of this band B, it is provided with a flange, F, bending back parallel with part B, to fit on the outside of band A, making a deep annular groove, G, in which the end of band A fits, so that the outer surface of band A will be covered by a wide collar of bright metal. To attach the band B, I coat the inner surface of the main part, also the outer surface of flange F, with a solution of Spanish whiting to protect it from the solder or other composition for uniting the bands, and then dip it in a bath of melted tin-metal, to coat the surfaces to be united with the band A; then apply a coat of solder to the portions of the surface of the band A with which band B is to be united, by dipping it; then place the two together, as represented in Fig. 3, the band B resting on any suitable table, and pour melted solder into the cavity between A and B, at H, which fills the said cavity and rises up between flange F and the band A, and unites with the coated surfaces of each, and secures them firmly together. Any excess of solder that may be left on the top of collar C I turn off in the lathe. The band is then finished or plated in the ordinary manner for market.

Having thus described my invention, I claim as new and desire to secure by Letters Patent—

A soft-metal trimming-band for wheel-hubs, constructed with the main part B, the collar C, and the flange F turned over so as to form a groove, G, as and for the purpose described.

GEO. H. JOHNSON.

Witnesses:
 THOMAS BOUDREN,
 ALFRED SCHWARENDORF.